United States Patent [19]
Arai

[11] Patent Number: 4,676,632
[45] Date of Patent: Jun. 30, 1987

[54] VARIABLE MAGNIFICATION COPYING OPTICAL SYSTEM

[75] Inventor: Yasunori Arai, Tokyo, Japan

[73] Assignee: Asahi Kogaku Kogyo Kabushiki Kaisha, Tokyo, Japan

[21] Appl. No.: 796,455

[22] Filed: Nov. 8, 1985

[30] Foreign Application Priority Data

Nov. 8, 1984 [JP] Japan .................................. 59-235490
Nov. 8, 1984 [JP] Japan .................................. 59-235491

[51] Int. Cl.$^4$ ......................... G03B 27/34; G03B 27/40
[52] U.S. Cl. ....................................................... 355/56
[58] Field of Search ..................................... 355/55-58

[56] References Cited

U.S. PATENT DOCUMENTS 3,779,642 12/1973 Ogawa et al. ..................... 355/56 X
4,218,133 8/1980 Biedermann ........................... 355/56
4,397,544 8/1983 Yajima et al. .......................... 355/58

Primary Examiner—Richard A. Wintercorn
Attorney, Agent, or Firm—Sughrue, Mion, Zinn, Macpeak and Seas

[57] ABSTRACT

A variable magnification copying optical system for projecting an image of an object, disposed on an object surface, to a focal plane and for varying a magnification of the image with respect to the object. The optical system includes a zoom lens movable to a plurality of positions for obtaining a first range of magnification values and a second lens for obtaining a further magnification value outside of the first range. To obtain the further magnification, the second lens is effectively moved into the optical projection path by moving the lens itself, changing the projection path, e.g., by a suitable shutter, or a combination of these steps. The second lens can provide the further magnification either alone or in combination with the zoom lens.

17 Claims, 10 Drawing Figures

VARIABLE MAGNIFICATION COPYING OPTICAL SYSTEM

BACKGROUND OF THE INVENTION

The present invention relates to a variable magnification optical system for copying machines, printing cameras or the like, in which a zoom range or variable magnification is increased up to a super enlargement range, for example, 4× magnification.

DESCRIPTION OF PRIOR ART

Conventional zooming systems for use in variable magnification optical apparatus such as copying machines are as follows:

(1) a system using a variable magnification lens (zoom lens);

(2) a system using a combination of a single fixed focus lens and a mechanism for correcting a distance from the object to the image (object/image distance);

(3) a system using a combination of a single fixed focus lens and a plurality of additional lenses; and (4) a system interchanging and using a plurality of fixed focus lenses.

However, the above-described systems involve the following defects.

In the system (1) using the zoom lens, it is possible to obtain a variable magnification range from about 1.5× to 0.6× and the object/image distance may be kept constant. Therefore, the system (1) is suitable for use in a copying machine. However, if a super enlargement magnification, e.g., 4×, or a super reduction magnification, e.g. 0.25×, is desired, the amount of movement of the overall lens system will become very large and the amount of change in space between lens units within the zoom lens will also become very large. As a result, the diameter of the zoom lens must be large and its structure complicated. At the same time, the optical system for the copying machine occupies a very large space and the image forming performance will suffer.

According to the system (2), during the variation of magnification, the object/image distance U is changed as follows:

$$U = -\frac{(1-m)^2}{m} \cdot f + \Delta$$

where cm is the magnification (<0), f is the focal length of the lens and $\Delta$ is a constant. Therefore, if f=200 nm and $\Delta$=0, the object/image distance $U_{1.0}$ at unity magnification is 800 mm whereas the object/image distance $U_{4.0}$ at 4× magnification is 1250.0 mm. Thus, the object/image distance U varies substantially. To compensate for this change requires an intricate mirror moving mechanism which increases the overall size of the optical system. In addition, the focusing ability of the system is not satisfactory.

The systems (3) and (4) need a plurality of additional lenses or interchangeable lenses corresponding to the number of desired magnifications. These systems are not suitable for recent copying machines which need an increased number of magnification modes.

FIG. 5 is a side elevational schematic view showing a conventional copying machine using a zoom lens. An original O is laid on a platen 1 and is irradiated with light from an illumination lamp 2. The image thereof is focused onto a sensitive drum 6 via mirror 3, zoom lens 4 and mirror 5. The original platen 1 is moved during the copying operation in a direction indicated by an arrow, thus scanning the original O in a slit manner. The successive slit segments of the original image are projected in order onto a surface of the sensitive drum 6 which rotates at a circumferential speed in correspondence with a scanning speed of the original plate 1. The image projected onto the sensitive drum 6 is copied through the well known processes of development, transfer and fixing.

FIG. 6 is a developed plan view of the optical path of the optical system shown in FIG. 5. In a regular magnification range, for example, 1.4× to 0.64×, the zoom lens 4 is moved from a position 4a to a position 4b in the optical axis direction with its lens units changing a space therebetween, thereby keeping constant a distance between the original O and the sensitive drum 6. Simultaneously therewith, the zoom lens 4 is moved also in a direction perpendicular to the optical axis so that the image at a standard point P for laying the original on the platen is focused on a focusing standard position Q on the sensitive drum 6 irrespective of the magnification change. For instance, the variable magnification copying optical apparatus using such a zoom lens is disclosed in Japanese Patent Application Laid-Open No. 133756/81.

However, when such a magnification varying means is used for obtaining a larger magnification (either enlargement or reduction) at a position 4c, the following disadvantages result.

(a) The space between the lens units of the zoom lens must be increased excessively and the structure therefor will become intricate.

(b) The lens diameter must be increased to allow larger spacing between the lens units.

(c) The range of movement of the overall zoom lens is excessive.

(d) The deterioration in focusing ability will be remarkable.

(e) The exposure quantity will vary over a side range.

SUMMARY OF THE INVENTION

In order to overcome the above-noted disadvantages, an object of the present invention is to provide a compact and less expensive variable magnification optical apparatus capable of exhibiting a multiplicity of magnifications practically in a continuous manner within a regular magnification range and capable of exhibiting a much larger magnification range with a simple structure.

This is achieved according to the present invention by providing a first optical means movable to a plurality of positions to project an image with a plurality of corresponding magnifications within a predetermined regular magnification range, and a second optical means movable into and out of the optical path for projecting the image at a higher magnification ratio when desired.

In third and fourth embodiments, the second projecting optical means is moved into the optical path by moving it in a direction normal to its optical axis. In a second embodiment, the movement to place the second projecting optical means in the optical path is in a direction parallel to the optical axis while simultaneously shifting the optical projection axis by means of a shutter to coincide with the optical axis of the second projecting optical means. The "movement" of the second projecting optical means into the optical path in the first embodiment is simply by shifting the projection optical path to coincide with the optical axis of the second projecting optical means through the use of an appropriate shutter.

In a fourth embodiment, the second optical means acts in combination with the first optical means to obtain the higher magnification, whereas in all other embodiments the second optical means operates alone in the higher magnification mode.

According to the invention, a variable magnification copying optical system for projecting an image of an object, disposed on an object surface, to a focal plane and for varying a magnification of the image with respect to the object, comprises first projecting optical means for independently carrying out a magnification operation within a predetermined regular magnification range; and second projecting optical means for cooperating with the first projecting optical means for carrying out a super enlargement magnification operation except for said predetermined regular magnification range of the first projecting optical means.

According to another aspect of the invention, a variable magnification copying optical system for projecting an image of an object, disposed on an object surface, to a focal plane and for varying a magnification of the image with respect to the object, comprises first projecting optical means for independently carrying out a magnification operation within a predetermined regular magnification range; and second projecting optical means for carrying out a super enlargement magnification operation, independently of the first projecting optical means, except for said predetermined regular magnification range of the first projecting optical means.

DETAILED DESCRIPTION OF THE PREFERRED EMBODIMENTS

Figure 5:
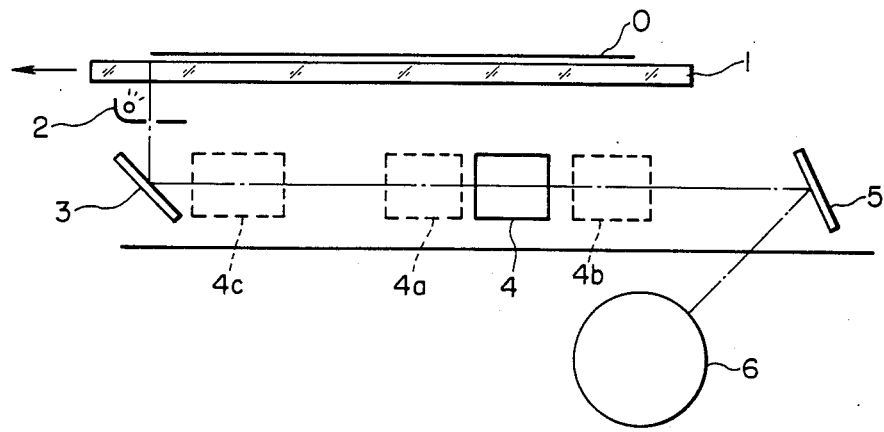
FIG. 5 is an illustration of a copying system in accordance with the prior art.
Figure 6:
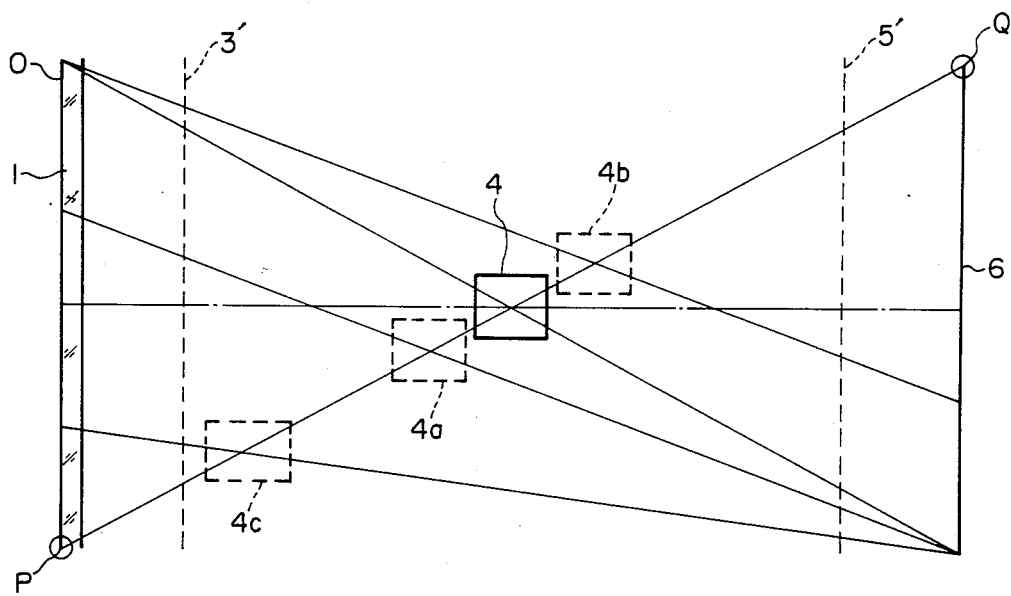
FIG. 6 is a developed view showing the movement of the optical means in accordance with the prior art.

The present invention will now be described with reference to FIGS. 1A through 4B. The various embodiments may all be used in the copying machine shown in FIG. 5. In FIGS. 1A to 4B, like reference characters are used to indicate like components or members shown in FIGS. 5 and 6.

Figure 1A:
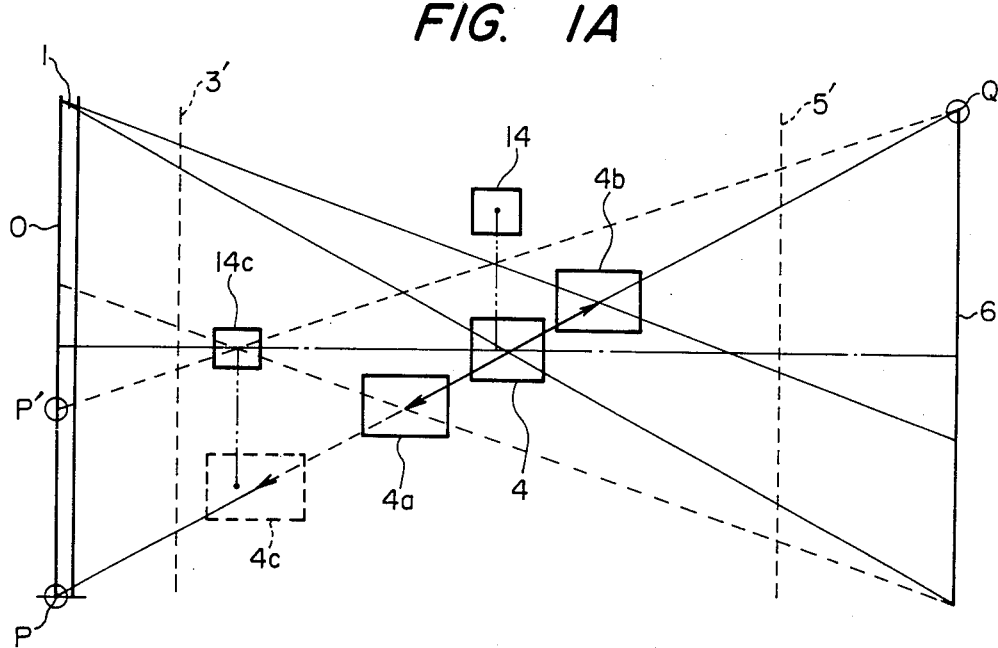
FIG. 1A is an illustration of a first embodiment of the invention.
Figure 1B:
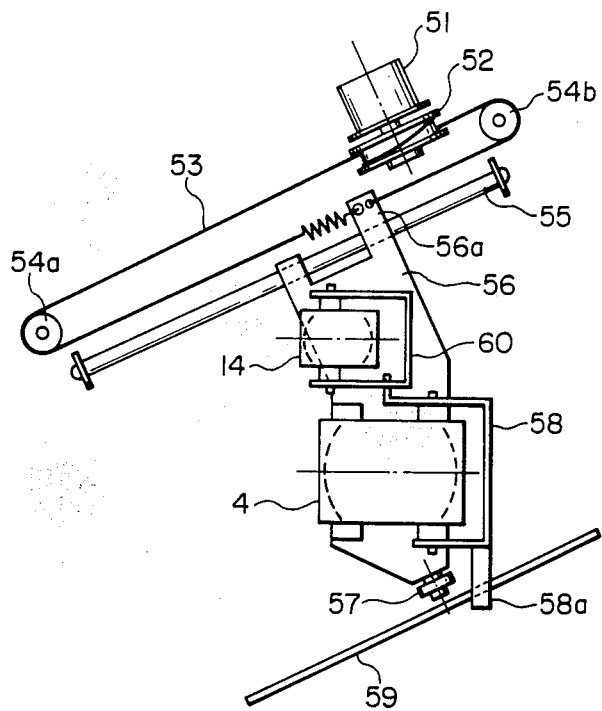
FIG. 1B is a schematic view-showing a mechanical driving means for optical means used in the optical system shown in FIG. 1A.

A first embodiment of the invention will be described in conjunction with FIGS. 1A and 1B. According to the first embodiment, a large magnification range, e.g., about four times the regular magnification range, may be obtained. In FIG. 1A, a zoom lens 4 is used as a first projecting optical system and a lens 14 for enlargement is used as a second projecting optical system.

More specifically, the first optical means, i.e., the zoom lens 4 is moved to a position $4a$ at a regular enlargement of 1.42×, and is moved to a position, shown by $4b$, at a regular reduction of 0.64 times. In accordance with the respective magnifications, a space between lens units within the zoom lens 4 is changed to thereby vary the magnification while keeping constant a distance between the original surface O and the focal plane (drum 6).

In the first embodiment, during the zooming operation within the regular zooming range, the zoom lens 4 is moved in the optical axis direction and simultaneously therewith moved in a vertical diretion with respect to the optical axis, so that an image of a reference point P for setting the original is always formed at a focusing reference point Q.

By way of example, the following parameters may be preferably used for the above-described zoom lens 4.

| object/image distance U = 800.0 FNo. 1:6.7  f = 197.590 | | | | | | |
|---|---|---|---|---|---|---|
| $R_1$ | 44.106 | $d_1$ | 5.238 | $N_1$ | 1.60548 | $\nu_1$ | 60.7 |
| $R_2$ | 121.109 | $d_2$ | 1.905 | | | |
| $R_3$ | −634.612 | $d_3$ | 2.381 | $N_2$ | 1.54345 | $\nu_2$ | 47.2 |
| $R_4$ | 43.071 | $d_4$ | 8.905 | | | |
| $R_5$ | 65.330 | $d_5$ | 4.686 | $N_3$ | 1.70346 | $\nu_3$ | 48.1 |
| $R_6$ | −109.524 524 | $d_6$ | 6.181 | | | |
| $R_7$ | −52.034 | $d_7$ | 2.143 | $N_4$ | 1.62409 | $\nu_4$ | 36.3 |
| $R_8$ | 99.524 | $d_8$ | 7.381 | | | |
| $R_9$ | −495.837 | $d_9$ | 6.190 | $N_5$ | 1.66152 | $\nu_5$ | 50.9 |
| $R_{10}$ | 50.476 | $d_{10}$ | *4.762 | | | |
| $R_{11}$ | −90.956 | $d_{11}$ | 6.381 | $N_6$ | 1.61686 | $\nu_6$ | 37.0 |
| $R_{12}$ | −42.613 | $d_{12}$ | 3.743 | | | |
| $R_{13}$ | 41.286 | $d_{13}$ | 3.810 | $N_7$ | 1.70557 | $\nu_7$ | 41.2 |
| $R_{14}$ | −123.810 | | | | | | where $R_i$ is the radius of curvature of the i-th lens surface, di is the thickness or space of the lens defined by the i-th lens surface and the (i+1)-th lens surface, Nj is the refractive indes of the j-th lens element, and $\nu_j$ is the Abbe number of the j-th lens element.

With such a lens system, when the zooming operation is performed while keeping the object/image distance constant, the following physical dimensions in the optical axis direction are obtained.

| magnification | A | $d_{10}$ | B |
|---|---|---|---|
| −1.00 | 381.110 | 4.762 | 354.530 |
| −0.64 | 472.119 | 16.171 | 252.141 |
| −1.41 | 316.805 | 11.483 | 402.425 |
| −4.00 | 152.338 | 163.325 | 400.547 | where A is the distance from the object surface (or image surface) to the first surface of the zoom lens, and B is the distance from the final surface (fourteenth surface) of the zoom lens to the focal plane (image forming surface).

As is apparent from the example, at the 4× magnification, the space $d_{10}$ is long, which would require that the diameter of the lens system be large. Therefore, according to the present invention, at the 4× magnification, the zoom lens 4 is located at the position 4c and the second projecting system, i.e., the enlargement lens 14, is located at the position 14c. In this case, since the zoom lens should not be contributing to the focusing effect, the zoom lens 4 is retracted to the position 4c where the zoom lens does not interrupt the optical path of the enlargement lens 14 located at the position 14c. Also, in the regular zooming range (positions 4a, 4 and 4b), the enlargement lens 4 is located at a position where the enlargement lens 14 does not interrupt the optical path of the zoom lens 4.

Such a movement of the zoom lens 4 and the enlargement lens 14 is attained by a lens moving mechanism which moves the two lens systems while keeping constant the relative position between them. This way dispense with any lens interchanging mechanism which would have a complicated structure.

The lens moving mechanism according to the invention will now be described in more detail. Referring now to FIG. 1B, the zoom lens is held by a slide base 56. The enlargement lens 14 is also held by a slide base 56 so that the relative positional relation between the zoom lens 4 and the enlargement lens 14 is kept constant. When the zoom lens 4 is located at the position 4c in FIG. 1, the enlargement lens 14 is located at the position 14c on the same optical axis as that of the zoom lens 4 in the unity magnification. A driving means for the slide base 56 comprises an electric motor 51. The electric motor 51 is not limited to any specific one, but a stepping motor is preferable for positional control. A wire pulley 52 is mounted on an output shaft of the motor 51. A wire 53 is wound around the pulley 52 to enhance the frictional engagement. The wire 53 is driven by the rotation of the motor 51 upon the zooming operation. Both ends of the wire 53 are connected to an arm 56a of the slide base 56. A pair of idle pulleys 54a and 54b are rotatably mounted on a stationary base plate (not shown). The wire 53 is entrained between the pair of idle pulleys 54a and 54b.

A guide shaft 55 is secured to the stationary base plate in parallel with the lens moving direction of the zooming operation. The slide base 56 on which the zoom lens 4 and the enlargement lens 14 are mounted is slidably engaged with and guided by the guide shaft 55 during the zooming operation. A roller 57 mounted on the slide base 56 serves to guide the movement of the slide base 56 in contact with the stationary base plate. A light quantity correcting plate 58 is pivotally mounted adjacent to the zoom lens 4 between the zoom lens and the drum 6. The change in light quantity caused by the zooming operation is corrected by the correcting plate 58 in a manner well known per se in the art. The pivotal movement of the correcting plate 58 may be attained by the cooperation of a cam follower 58a provided on the correcting plate 58 and a cam 59 held in contact with the cam follower 58a. A sheild plate 60 is provided adjacent to the enlargement lens 14 between the latter and the drum 6. The shield plate 60 is opened during the use of the enlargement lens 14 and is closed during the use of the zoom lens 4. The shield plate is opened by the movement of the correcting plate 58 at a time when the correcting plate 58 is closed to interrupt the light passing through the zoom lens 4.

With such a construction, the defects (a) and (b) inherent in the prior art may be overcome. With respect to the defect (c), the movement of the zoom lens 4 for zooming is small between the positions 4a and 4b, and it is sufficient to add to the zoom lens such a movement that the zoom lens may be retracted to the position 4c.

With respect to the defect (d), the enlargement lens 14 may be designed independently of the need for variable magnification, and the focusing performance at the specific desired magnification (4×) is greatly improved. Furthermore, since the aberration correction of the zoom lens 4 must be provided only over a regular short mgnification range, it is possible to maintain a good performance for the aberration correction.

Also, with respect to the defect (e), according to the invention, an advantageous condition is established as follows. A focal plane illumination Em upon the zooming operation is given by the following expression:

$$Em = \frac{T}{(1-m)^2 \cdot F^2}$$

where T is a constant number, m is the magnification (expressed as a negative number as above) and F is the F number of the lens. Assuming that F to be kept constant and assuming the illumination $E_1$ at magnification of $-1.00$ to be a reference level, the illumination ratio $E_{4.0}$ in the case where the zoom lens 4 would be used as it is at the 4× magnification is given by:

$$E_{4.0} = T/25F^2 = E_1/6.25$$

This shows a remarkable reduction in illumination. However, according to the first embodiment of the present invention, since various parameters of the enlargement lens or "second projecting means" 14, such as a focal length f, an F number and the like may be selected independently of the zoom lens 4 or "first optical system", an F number of the enlargement lens may be selected so that the exposure amount at 4× magnification is substantially the same as that in the regular magnification, and the lens 14 can also be designed to match various parameters such as a slit condition of the slit exposure, an F number of the zoom lens 4, a desired enlarging magnification and the like. Therefore, according to the first embodiment of the invention, a substantial change in exposure amount may be avoided.

A preferred example for the enlargement lens 4 is as follows:

| f = 128.0 | | Enlargement = −4.00x OBJECT/IMAGE DISTANCE = 800.0 | | | | | |
|---|---|---|---|---|---|---|---|
| $R_1$ | 57.303 | $d_1$ | 5.067 | $N_1$ | 1.59143 | $v_1$ | 61.0 |
| $R_2$ | 697.939 | $d_2$ | 16.533 | | | | |
| $R_3$ | −39.672 | $d_3$ | 1.457 | $N_2$ | 1.60718 | $v_2$ | 38.0 |
| $R_4$ | 77.722 | $d_4$ | 4.429 | | | | |
| $R_5$ | 221.015 | $d_5$ | 7.438 | $N_3$ | 1.65376 | $v_3$ | 56.2 |
| $R_6$ | −39.768 | | | | | | | where the various terms are as defined earlier with respect to the preferred example of the zoom lens 4.

In the first embodiment, the reference point for setting the original is located at the point P during the regular zooming operation but the reference point is moved to the point P' for super enlargement (4×).

Figure 2A:
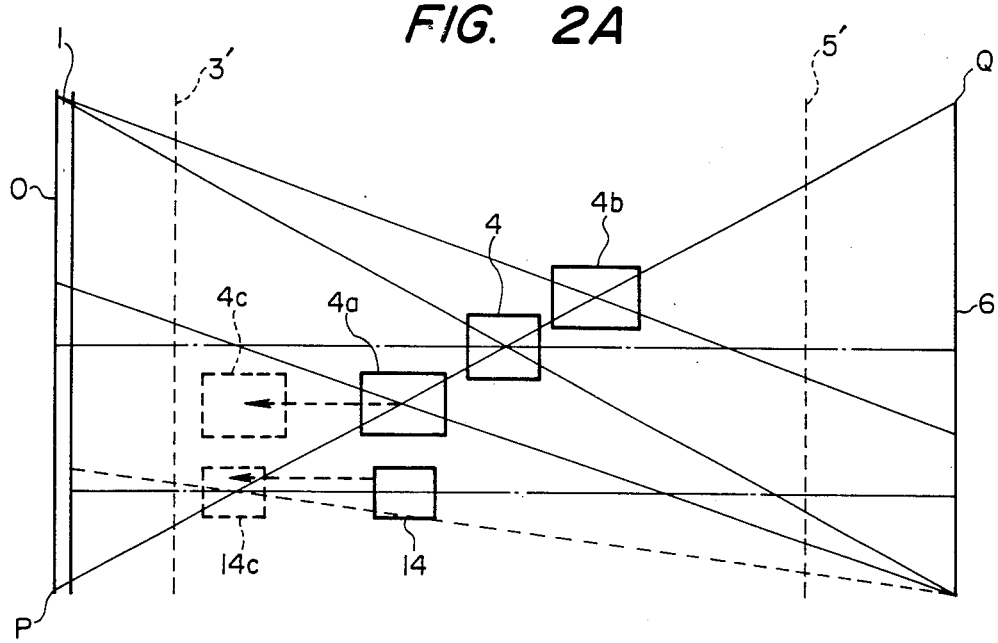
FIG. 2A is an illustration of a second embodiment of the invention.

A second embodiment of the invention has a structure shown in FIG. 2A in which, during 4× operation, the zoom lens 4 is offset from a line connecting the reference point P for setting the original and the focal reference point Q, as indicated by 4c. Instead of the zoom lens 4, the enlargement lens 14 is now interposed in the line PQ. In the second embodiment, also in the 4× magnification, since the original O at the original setting reference point P is focused on the focal reference point Q, the original setting reference position may be kept unchanged at P. However, an angle of view of the enlargement lens 14 for the second embodiment must be larger than that of the first embodiment.

Figure 2B:
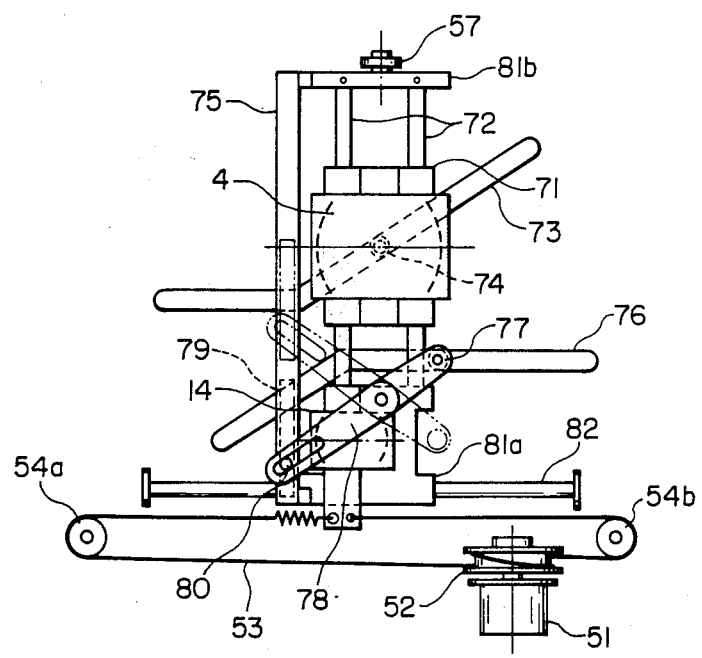
FIG. 2B is a schematic view showing a mechanical driving means for optical means used in the optical system shown in FIG. 2A.

A lens moving mechanism for the second embodiment will be described with reference to FIG. 2B. A slide base 81a is engaged slidably with a guide shaft 82 and carried thereon the enlargement lens 14. A pair of guide shafts 72 and a shield plate 75 are secured to the slide base 81a and the associated slide base 81b. A roller 57 is mounted on the slide base 81b. The guide shaft 82 is fixed to a base plate (not shown) in parallel with the optical axis of the zoom lens 4. The guide shaft 82 serves to guide the movement of the slide base 81a. A lens holder 71 carried thereon the zoom lens 4 and slidably engages with the guide shafts 72. The lens holder 71 is provided with a rotatable cam follower 74. The guide shafts 72 serve to guide the lens 4 in a direction normal to the optical axis direction. A cam groove 73 is formed in conformity with the desired movement of the lens 4 during the zooming operation. The cam groove 73 is cammingly engaged with the cam follower 74 which is rotatably provided at a lower portion of the lens holder 71. The mask plate 75 is provided so as to interrupt the light from the original. The mask plate 75 guides a movable mask plate 79. A cam groove 76 is cammingly engaged with the cam follower 77 for operating the movable mask plate. A lever 78 is pivotally mounted on the slide base 81a. The lever 78 is engaged rotatably with the cam follower 77 at one end and at the other end through an oblong hole with a pin 80 fixed to the movable mask plate 79. The movable mask plate 79 interrupts light to the enlargement lens 14 during use of the lens 4 and, when both lenses are moved leftwardly in FIGS. 2A and 2B, interrupts light to the zoom lens 4 during use of the enlargement lens 14.

Figure 3A:
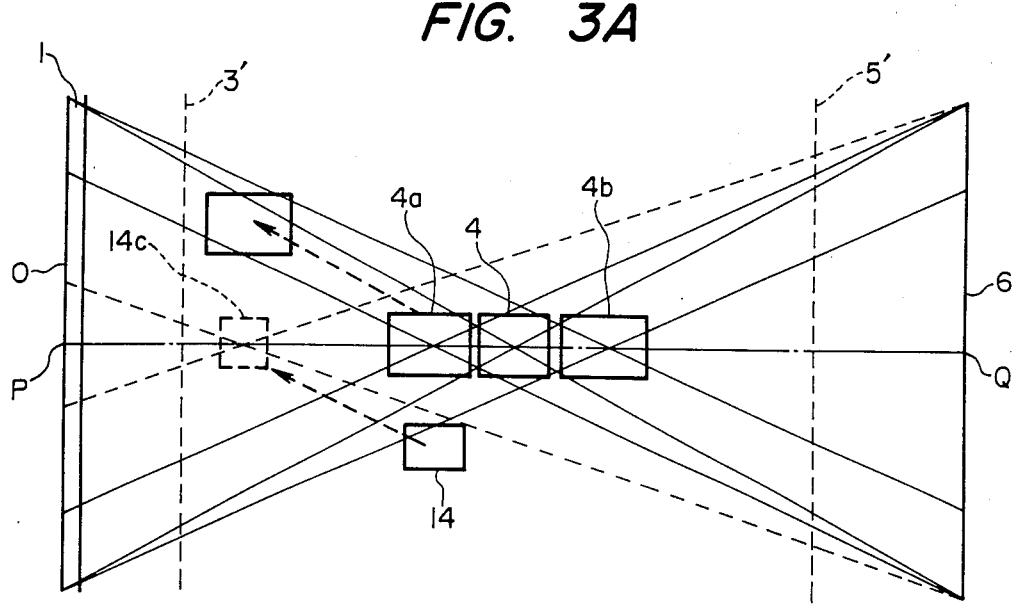
FIG. 3A is an illustration of a third embodiment of the invention.

FIG. 3A shows another embodiment of the invention. In the third embodiment, the zoom lens 4 is moved in the optical axis direction only. The reference points P and Q for the original setting and the drum surface image forming position are also located on the optical axis of the zoom lens 4. With such a system, the view angle of the zoom lens 4 becomes a maximum angle at the unity magnification and is smaller than the maximum angle at other magnifications. This makes it possible to make the zoom lens 4 small in size. At the time of 4× magnification, the zoom lens 4 is offset to the position 4c where it does not interrupt the light flux for the enlargement lens 14c which is at that time interposed in the optical path.

Figure 3B:
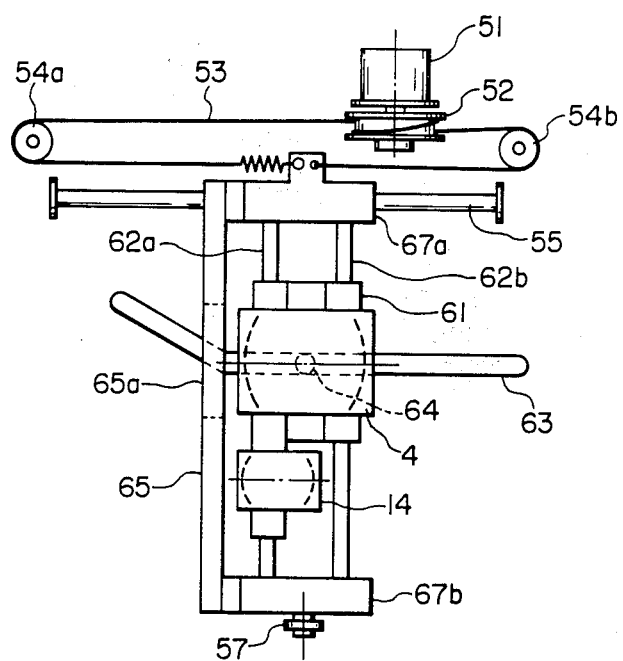
FIG. 3B is a schematic view showing a mechanical driving means for optical means used in the optical system shown in FIG. 3A.

A lens moving mechanism for the third embodiment will be explained with reference to FIG. 3B. A driving means including a motor 51, a pulley 52, a wire 53 and a pair of idle pulleys 54a and 54b is substantially the same as shown in FIG. 1B. Also, in FIG. 3B, a roller 57 is the same as shown in FIG. 1B. A slide base 67A is slidably engaged with a guide shaft 55. A pair of guide shafts 62a and 62b connect the slide base 67a to the other slide base 67b. A mask plate 65 is fixed to the slide bases 67a and 67b. The roller 57 is mounted on the slide base 67b. The guide shaft 55 is mounted in parallel with the optical axis of the zoom lens 4. A lens holder 61 holds the zoom lens 4 and the enlargement lens 14 and engages with the guide shafts 62a and 62b to be guided in the direction perpendicular to the axial direction. The lens holder 61 is also provided on its lower surface with a roller 64 which engages with a cam groove 63. The guide shafts 62a and 62b are secured to the slide bases 67a and 67b to extend in the direction perpendicular to the optical axis and serve to guide the zoom lens 4 in this perpendicular direction. The cam groove 63 is formed in accordance with the desired movement of the lens 4. The cam groove 63 is curved so that, during the use of the enlargement lens 14, the cam groove 63 will move the lens assembly upward in FIG. 3B until the optical axis of the lens 14 is along the optical axis used by the zoom lens 4 during the regular zooming operation. The mask plate 65 is provided to interrupt the light from the original side. The mask plate 65 has an opening 65a at a stationary single position for introducing light only into whichever of the zoom lens 4 or the enlargement lens 14 is positioned adjacent the opening.

Figure 4A:
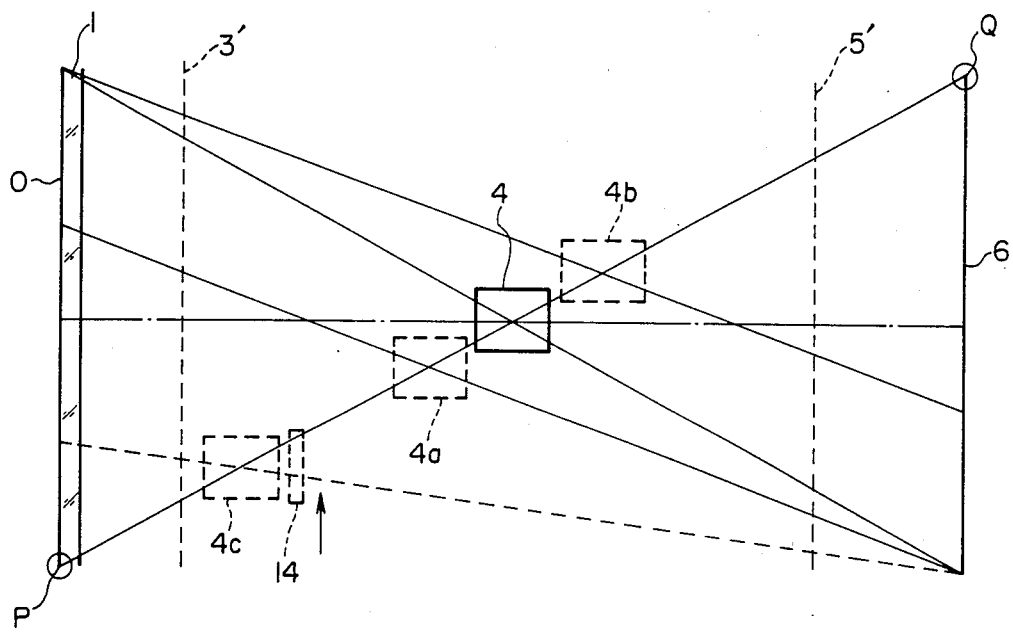
FIG. 4A is an illustration of a fourth embodiment.

FIG. 4A shows a fourth embodiment of the invention. Also, in this embodiment, the super enlargement magnification (4×) may be obtained. The first optical means comprising zoom lens 4 is moved, at the 4× magnification, to the position 4c. In order to obviate the defects (a) and (b), the zoom lens 4 is moved to 4c while the space between the lens groups of the zoom lens is being kept at a predetermined constant value in the vicinity of the spacing at the regular magnification. Accordingly, in this case, the distance from the original O to the drum 6 is not kept constant. According to the invention, the second optical means comprising additional lens 14 is interposed in front of or behind the position 4c of the zoom lens to thereby keep constant the distance from the original O to the drum 6.

By way of example, also the preceding parameters may be preferable for this zoom lens system. According to the lens system, it is possible to attain the zooming operation within a regular zoom range from 1.42 to 0.64 times by changing the distance $d_{10}$ while moving the overall lens system. The physical dimension in the optical direction would normally be changed in accordance with the magnification as follows:

| MAGNIFICATION | $d_{10}$ |
| --- | --- |
| −1.00 | 4.762 |
| −1.41 | 11.438 |
| −0.64 | 16.171 |
| −4.00 | 163.324 |

Therefore, the change of the distance $d_{10}$ is too large to carry out the 4× zooming operation without any modification to the lens system. This raises the problems (a) and (b) described before. According to the invention, under the condition that the distance $d_{10}$ is fixed at 11.438, the additional lens subsystem having the following parameters is added 0.711 after the above-described zoom lens system. As a result, the object/image distance may be fixed at 800.0 mm and the 4× magnification may be attained with the distance $d_{10}$ being kept at 11.438.

| ADDITIONAL LENS PARAMETERS | | | | | |
| --- | --- | --- | --- | --- | --- |
| | $d_{14}$ | 0.711 | | | |
| $R_{15}$ −495.238 | $d_{15}$ | 5.714 | $N_8$ | 1.51825 | $v_8$ 64.1 |
| $R_{16}$ −105.524 | | | | | |

Figure 4B:
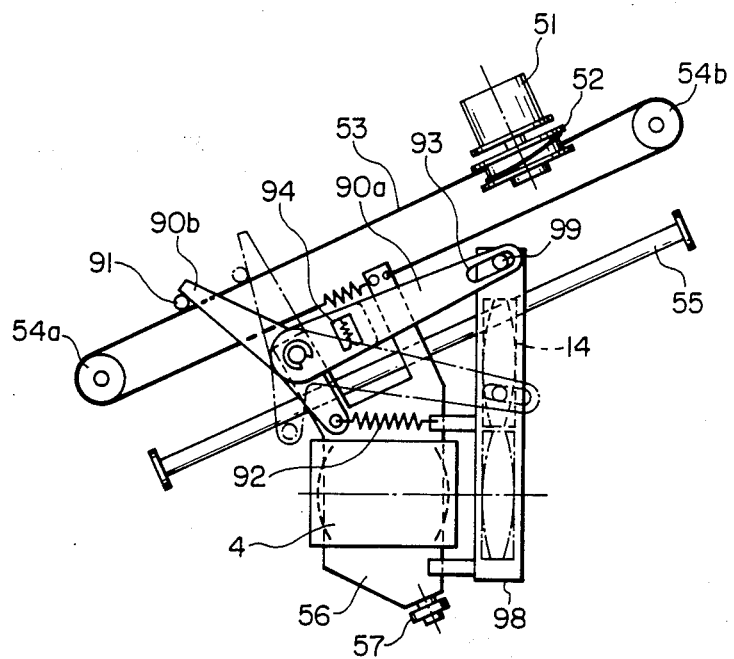
FIG. 4B is a schematic view showing a mechanical driving means for optical means used in the optical system shown in FIG. 4A.

A lens moving mechanism for the fourth embodiment will now be described with reference to FIG. 4B. The additional lens 14 is provided to an additional lens holder 98 to be movable in a direction normal to the optical axis of the zoom lens 4. The additional lens 14 is provided so that, in the super enlargement operation, the optical axis of the additional lens 14 is identical with that of the zoom lens 4. A slide base 56 is slidably engaged with a guide shaft 55 to be guided thereby and carries thereon the zoom lens 4, the additional lens holder 98 and a roller 57. A slide pin 99 is connected to the additional lens 14 and is engaged with an oblong hole 93 formed one end of the lever 90a which is pivotally mounted on the slide base 56 to be movable angularly thereby moving the additional lens 14. The lever 90a is connected through a spring 94 to a lever 90b which is angularly movable on the slide base 56. The lever 90b is biased by a spring 92 to offset the additional lens 14 from the optical path of the zoom lens 4. When the wire 53 moves the zoom lens 4 to the super enlargement position, the lever 90b is actuated by a pin 91 fixed to the wire 53. This pivots the lever 90b clockwise and lowers the lens 14 into alignment with the lens 4.

The foregoing embodiments are described with reference to a 4× magnification system, but it is possible to obtain any magnification on the enlargement or reduction side by suitably selecting an arrangement and parameters of the lens 14.

Also, in the foregoing description, a zoom lens is used as a first projecting optical means in order to obtain a predetermined magnification range but it is apparent for one skilled in the art that a fixed focus lens may be used instead of the zoom lens. In this case, the distance between the original and the image must be changed in accordance with a predetermined magnification.

As described above, according to the present invention, in a regular zooming range, a number of continuous magnifications may be attained by the first projecting optical means, and a super enlargement mgnification may be obtained by a second projecting optical means with a simple structure. This makes it possible to provide a zoom copying machine which is small in size with a wide magnification range and which may be made in low cost. Also, the second optical means may be selected independently of the first optical means so that the problems of degradation in optical performance and change in exposure which would otherwise be encountered may be solved.

I claim:

1. A variable magnification copying optical system for projecting an image of an object onto a focal plane and for varying a magnification of said image with respect to said object, said system comprising:
   a first projecting optical means movable to a plurality of positions in an optical path between said object and image for projecting said image with a corresponding plurality of magnifications over a predetermined magnification range;
   a second projecting optical means movable into and out of said optical path for projecting said image with a further magnification outside of said predetermined magnification range.

2. An optical system according to claim 1, wherein said further magnification is a super enlargement magnification higher than the regular magnifications defined by said predetermined range.

3. An optical system according to claim 1, wherein the optical axis of said first projecting optical means is along a different line in each of said plurality of positions, and the optical axis of said second projecting optical means, when moved into said optical path, coincides with one of said different axes.

4. An optical system according to claim 1, wherein the optical axis of said second optical means when positioned in said optical path is coincident with the optical axis of said zoom lens in a unity magnification position.

5. An optical system according to claim 1, wherein the optical axis of said first projecting optical means is along a different line in each of said plurality of positions, said second optical means is at a fixed distance from said first optical means in a direction perpendicular to said optical axis of said first optical means, and said second optical means is moved into said optical path by moving said first and second optical means in a direction parallel to said optical axis from one of said plurality of positions.

6. An optical system according to claim 3, wherein said first optical means comprises a zoom lens and said second optical means comprises a further lens.

7. An optical system according to claim 6, wherein said zoom lens is movable along a first line (PQ) between each of said plurality of positions, said further lens is mounted a predetermined distance from the optical axis of said zoom lens in a direction perpendicular to said optical axis, and said further lens is moved into said optical path by moving said zoom lens along the direction of said first line.

8. An optical system according to claim 1, wherein said first optical means comprises a first lens and is movable along the direction of its optical axis to each of said plurality of positions, and said second optical means is a second lens mounted a predetermined distance from said first lens in a direction perpendicular to said optical axis and is movable into said optical path by moving said first lens perpendicularly to its optical axis until the optical axis.

9. An optical system according to claim 1, wherein said first optical system comprises a first lens movable along a first path to each of said plurality of positions, and is movable along said path to a further position, and said second optical means comprises a second lens movable to a position in which its optical axis coincides with the optical axis of said first lens in said further position, whereby said first and second lenses combine to provide said further magnification.

10. An optical system according to claim 1, further comprising shutter means for blocking said first optical means and unblocking said second optical means to effectively move said second optical means into said optical path.

11. A variable magnification copying optical system for projecting an image of an object, disposed on an object surface, to a focal plane and for varying a magnification of the image with respect to the object, comprising:
    first projecting optical means for independently carrying out a magnification operation with a plurality of magnifications within a predetermined regular magnification range; and
    second projecting optical means for carrying out a super enlargement magnification operation, outside of said predetermined regular magnification range of said first projecting optical means.

12. The optical system according to claim 11, wherein said first projecting optical means comprises a zoom lens for carrying out the magnification operation while keeping constant a distance between the object and image.

13. The optical system according to claim 11, wherein said first projecting optical means comprises a fixed focus lens for carrying out the magnification operation while varying a distance between the object and image.

14. The optical system according to claim 11, wherein the distance between the object and image of said second optical means is equal to the distance between the object and image of said first optical means.

15. A variable magnification copying optical system for projecting an image of an object, disposed on an object surface, to a focal plane and for varying a magnification of the image with respect to the object, comprising:

first projecting optical means for independently carrying out a magnificaiton operation with a plurality of magnifications within a predetermined regular magnification range; and second projecting optical means for cooperating with said first projecting optical means for carrying out a super enlargement magnification operation outside of said predetermined regular magnification range of said first projecting optical means.

16. The optical system according to claim 15, wherein said first projecting optical means comprises a zoom lens for carrying out the magnification operation while keeping constant a distance between the object and image.

17. The optical system according to claim 15, wherein said first projecting optical means comprises a fixed focus lens for carrying out the magnification operation while varying a distance between the object and image.

* * * * *